US010049124B2

(12) United States Patent
Son et al.

(10) Patent No.: US 10,049,124 B2
(45) Date of Patent: Aug. 14, 2018

(54) APPARATUS AND METHOD OF TRACKING LOCATION OF WIRELESS TERMINAL BASED ON IMAGE (71) Applicant: Samsung Electronics Co. Ltd., Suwon-si, Gyeonggi-do (KR)

(72) Inventors: Tae-Hwan Son, Suwon-si (KR); Jun-Ho Lee, Suwon-si (KR); Kyu-Sung Cho, Suwon-si (KR); Sung-Hwan Baek, Suwon-si (KR); Jin-He Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 13/908,461

(22) Filed: Jun. 3, 2013

(65) Prior Publication Data

US 2013/0332482 A1    Dec. 12, 2013

(30) Foreign Application Priority Data

Jun. 6, 2012    (KR) ........................ 10-2012-0060680

(51) Int. Cl.
*G06F 17/30*    (2006.01)

(52) U.S. Cl.
CPC .. *G06F 17/30277* (2013.01); *G06F 17/30247* (2013.01)

(58) Field of Classification Search
CPC ......... G06F 17/30247; G06F 17/30265; G06F 17/30277; G06F 17/30038; G06F 17/30879; G06F 17/30; G06Q 30/02; G06Q 30/0256
See application file for complete search history.

(56) References Cited

U.S. PATENT DOCUMENTS

| 8,131,118 | B1 * | 3/2012 | Jing et al. ..................... 382/305 |
| 2003/0198368 | A1 * | 10/2003 | Kee .................... G07C 9/00158 |
| | | | 382/118 |
| 2004/0004737 | A1 * | 1/2004 | Kahn et al. .................. 358/1.15 |
| 2004/0201702 | A1 * | 10/2004 | White ....................... 348/207.99 |
| 2005/0076004 | A1 * | 4/2005 | Yanagisawa et al. ............ 707/1 |
| 2005/0147282 | A1 * | 7/2005 | Fujii ................... G06K 9/00087 |
| | | | 382/124 |
| 2006/0056660 | A1 * | 3/2006 | Tojo ............................. 382/112 |
| 2008/0301133 | A1 | 12/2008 | Brown et al. |

(Continued)

FOREIGN PATENT DOCUMENTS

| KR | 10-2009-0007883 A | 1/2009 |
| KR | 10-0953141 A | 4/2010 |

*Primary Examiner* — Scott A. Waldron
*Assistant Examiner* — Fatima P Mina
(74) *Attorney, Agent, or Firm* — Jefferson IP Law, LLP (57) ABSTRACT An apparatus for tracking a location of a wireless terminal based on an image is provided. The apparatus includes an image matching database to store images classified by regions, and a matcher to receive a query image captured by a camera module of the wireless terminal and image matching data that contains region information about where the query image is captured, to search the image matching database for a matching image that corresponds to the image matching data, to determine if the query image matches the matching image, and to send the wireless terminal location information that corresponds to the matching information if the query image matches the matching image.

21 Claims, 7 Drawing Sheets (56) References Cited

U.S. PATENT DOCUMENTS

| | | | |
|---|---|---|---|
| 2009/0150962 A1* | 6/2009 | Kim | H04N 7/163 |
| | | | 725/118 |
| 2010/0009700 A1* | 1/2010 | Camp, Jr. | H04M 1/72572 |
| | | | 455/456.6 |
| 2010/0250136 A1 | 9/2010 | Chen | |
| 2011/0038527 A1* | 2/2011 | Liu | 382/145 |
| 2011/0064312 A1* | 3/2011 | Janky | G01C 15/00 |
| | | | 382/195 |
| 2012/0027311 A1 | 2/2012 | Cok | |

\* cited by examiner

APPARATUS AND METHOD OF TRACKING LOCATION OF WIRELESS TERMINAL BASED ON IMAGE

PRIORITY

This application claims the benefit under 35 U.S.C. § 119(a) of a Korean patent application filed on Jun. 6, 2012 in the Korean Intellectual Property Office and assigned Serial No. 10-2012-0060680, the entire disclosure of which is hereby incorporated by reference.

BACKGROUND OF THE INVENTION

1. Field of the Invention

The present invention relates generally to an apparatus and method of tracking a location. More particularly, the present invention relates to an apparatus and method of tracking a location of a wireless terminal based on an image.

2. Description of the Related Art

Recently, many different location-based services are provided for wireless terminals. The services include showing a map, offering a Global Positioning System (GPS) service, and providing a location tracing service around where the wireless terminal is located.

A GPS module is built in the wireless mobile terminal to measure the location of the wireless terminal, but its accuracy is not always sufficient. Thus, there is a need for a method of accurately tracking a location of a wireless terminal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to increase measurement accuracy with an apparatus and method of tracking a location of a wireless terminal based on an image.

Another aspect of the present invention is to provide an image matching database to increase the measurement accuracy with an apparatus and method of tracking a location of a wireless terminal based on an image.

Another aspect of the present invention is to provide an updating technique to increase the measurement accuracy with an apparatus and method of tracking a location of a wireless terminal based on an image.

Another aspect of the present invention is to provide an augmented reality service by increasing the measurement accuracy with an apparatus and method of tracking a location of a wireless terminal based on an image.

In accordance with an aspect of the present invention, an apparatus for tracking a location of a wireless terminal based on an image is provided. The apparatus includes an image matching database to store images classified by regions, and a matcher to receive a query image captured by a camera module of the wireless terminal and image matching data that contains region information about where the query image is captured, to search the image matching database for a matching image that corresponds to the image matching data, to determine if the query image matches the matching image, and to send the wireless terminal location information that corresponds to the matching information if the query image matches the matching image.

In accordance with another aspect of the present invention, a method of tracking a location of a wireless terminal based on an image is provided. The method includes capturing, by a camera module of the wireless terminal, a query image, providing, by a communication module of the wireless terminal, the query image and image matching data that contains region information about where the query image is captured to a matcher, searching an image matching database for a matching image that corresponds to the image matching data, determining if the query image matches the matching image, and sending the wireless terminal location information that corresponds to the matching information if the query image matches the matching image.

The image matching database may store images by classifying images classified by regions by periods.

The image matching database may store images by classifying images classified by regions by weather conditions.

The region information may include at least one of Global Positioning System (GPS) data and orientation data.

The image matching data may further include time information about when the query image is captured.

The image matching data may further include weather information about a weather condition under which the query image is captured.

The location information may include position information and orientation information containing latitude, longitude, and altitude to build a three dimensional map.

The apparatus may further include an updater for storing in the image matching database a query image that made a match, if a matching success rate of the query image is greater than a predetermined threshold.

The apparatus may further include an updater for storing in the image matching database the query image that made a match with the matching image by replacing the matching image by the query image, if a matching success rate of the query image is greater than a predetermined threshold.

The apparatus may further include an updater for storing in the image matching database a query image selected by a user from among a plurality of query images, if a matching success rate of each of the plurality of query images obtained from a plurality of matching processes is greater than a predetermined threshold.

The location information may be used to offer a location-based street-view service or a location-based Augmented Reality (AR) service.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
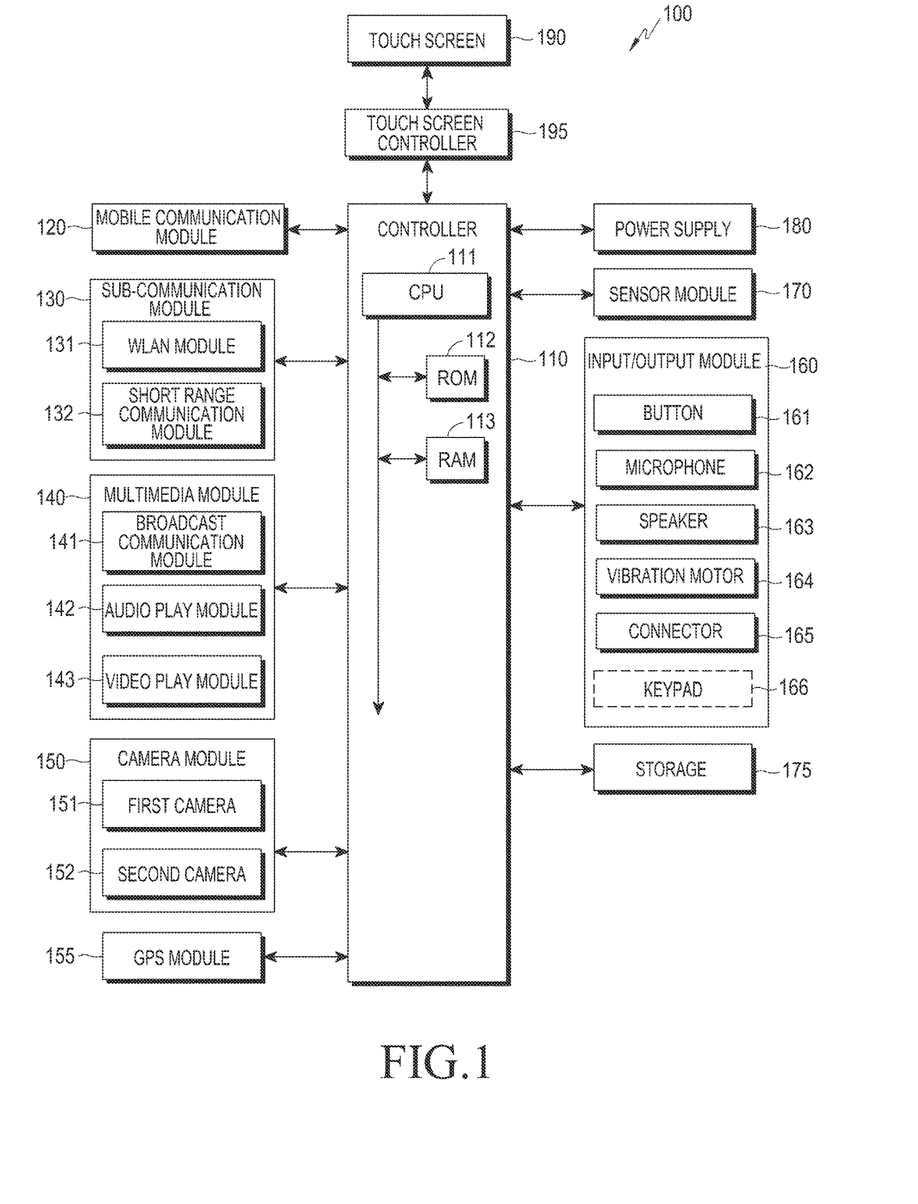
FIG. 1 is a schematic block diagram of a wireless terminal according to an exemplary embodiment of the present invention.

FIG. 1 is a schematic block diagram of a wireless terminal according to an exemplary embodiment of the present invention.

Referring to FIG. 1, a wireless terminal 100 may be connected to an external device (not shown) via a mobile communication module 120, a sub-communication module 130, and/or a connector 165. The "external device" includes another device, a cell phone, a smart phone, a tablet Personal Computer (PC), and a server, all of which are not shown.

Referring to FIG. 1, the wireless terminal 100 includes the touch screen 190 and a touch screen controller 195. The wireless terminal 100 also includes a controller 110, the mobile communication module 120, the sub-communication module 130, a multimedia module 140, a camera module 150, a Global Positioning System (GPS) module 155, an input/output module 160, a sensor module 170, a storage 175, and a power supply 180. The sub-communication module 130 includes at least one of Wireless Local Area Network (WLAN) 131 and a short range communication module 132, and the multimedia module 140 includes at least one of a broadcast communication module 141, an audio play module 142, and video play module 143. The camera module 150 includes at least one of a first camera 151 and a second camera 152. The input/output module 160 includes at least one of one or more buttons 161, a microphone 162, a speaker 163, a vibration motor 164, a connector 165, and a keypad 166.

The controller 110 may include a Central Processing Unit (CPU) 111, a Read Only Memory (ROM) 112 for storing a control program to control the wireless terminal 100, and a Random Access Memory (RAM) 113 for storing signals or data input from an outside or for being used as a memory space for working results in the wireless terminal 100. The CPU 111 may include a single core, dual cores, triple cores, quad cores, or any other number of cores. The CPU 111, ROM 112, and RAM 113 may be connected to each other via an internal bus.

The controller 110 may control the mobile communication module 120, the sub-communication module 130, the multimedia module 140, the camera module 150, the GPS module, the input/output module 160, the sensor module 170, the storage 175, the power supply 180, the touch screen 190, and the touch screen controller 195.

The mobile communication module 120 uses at least one-one or more-antennas (not shown) under control of the controller 110 to connect the wireless terminal 100 to an external device through mobile communication. The mobile communication module 120 transmits/receives wireless signals for voice calls, video conference calls, Short Message Service (SMS) messages, or Multimedia Message Service (MMS) messages to/from a cell phone (not shown), a smart phone (not shown), a tablet PC (not shown), or another device (not shown), the phones having phone numbers entered into the wireless terminal 100.

The sub-communication module 130 may include at least one of the WLAN module 131 and the short range communication module 132. For example, the sub-communication module 130 may include either the WLAN module 131 or the short range communication module 132, or both.

The WLAN module 131 may be connected to the Internet in a place where there is an Access Point (AP) (not shown), under control of the controller 110. The WLAN module 131 supports Institute of Electrical and Electronics Engineers (IEEE's) WLAN standard IEEE802.11x. The short range communication module 132 may conduct short range communication between the wireless terminal 100 and an image rendering device (not shown) under control of the controller 110. The short range communication module may include Bluetooth, Infrared Data Association (IrDA), etc.

The wireless terminal 100 may include at least one of the mobile communication module 120, the WLAN module 131 and the short range communication module 132 based on the performance. For example, the wireless terminal 100 may include a combination of the mobile communication module 120, the WLAN module 131 and the short range communication module 132 based on the performance.

The multimedia module 140 may include the broadcast communication module 141, the audio play module 142, or the video play module 143. The broadcast communication module 141 may receive broadcast signals (e.g., television broadcast signals, radio broadcast signals, or data broadcast signals) and additional broadcast information (e.g., Electric Program Guide (EPG) or Electric Service Guide (ESG)) transmitted from a broadcasting station through a broadcast communication antenna (not shown) under control of the controller 110. The audio play module 142 may play digital audio files (e.g., files having extensions, such as mp3, wma, ogg, or way) stored or received under control of the controller 110. The video play module 143 may play digital video files (e.g., files having extensions, such as mpeg, mpg, mp4, avi, move, or mkv) stored or received under control of the controller 110. The video play module 143 may also play digital audio files.

The multimedia module 140 may include the audio play module 142 and the video play module 143 except for the broadcast communication module 141. The audio play module 142 or video play module 143 of the multimedia module 140 may be included in the controller 100.

The camera module 150 may include at least one of the first and second cameras 151 and 152 for capturing still images or video images under control of the controller 110. Furthermore, the first or second camera 151 or 152 may include an auxiliary light source (e.g., a flash) for providing as much an amount of light as required for capturing. The first camera 151 may be placed on the front of the wireless terminal 100 and the second camera 152 may be placed on the back of wireless terminal 100. In another way, the first and second cameras 151 and 152 are arranged adjacent to each other (e.g., the distance between the first and second cameras 151 and 152 may be in the range between 1 to 8 cm), capturing 3 Dimensional (3D) still images or 3D video images.

The GPS module 155 receives radio signals from a plurality of GPS satellites (not shown) in Earth's orbit, and may calculate the position of the wireless terminal 100 by using time of arrival from the GPS satellites to the wireless terminal 100. Locations of the wireless terminal 100 calculated by the GPS module 155 may be expressed in at least one of the latitude, longitude, altitude, and three dimensional orientation.

The input/output module 160 may include at least one of the plurality of buttons 161, the microphone 162, the speaker 163, the vibrating motor 164, the connector 165, and the keypad.

The at least one of one or more buttons 161 may be arranged on the front, side, or back of the housing of the wireless terminal 100, and may include at least one of power/lock button (not shown), volume button (not shown), menu button, home button, back button, and search button.

The microphone 162 generates electric signals by receiving voice or sound under control of the controller 110.

The speaker 163 may output sounds corresponding to various signals (e.g., radio signals, broadcast signals, digital audio files, digital video files or photography signals) from the mobile communication module 120, sub-communication module 130, multimedia module 140, or camera module 150 to an outside under control of the controller 110. The speaker 163 may output sounds (e.g., button-press sounds or ringback tones) that correspond to functions performed by the wireless terminal 100. There may be one or multiple speakers 163 arranged in a proper position or proper positions of the housing of the wireless terminal 100.

The vibrating motor 164 may convert an electric signal to a mechanical vibration under control of the controller 110. For example, the wireless terminal 100 in a vibrating mode operates the vibrating motor 164 when receiving a voice call from another device (not shown). There may be one or more vibration motors 164 inside the housing of the wireless terminal 100. The vibration motor 164 may operate in response to a touch activity or continuous touches of a user over the touchscreen 190.

The connector 165 may be used as an interface for connecting the wireless terminal 100 to the external device (not shown) or a power source (not shown). Under control of the controller 110, data stored in the storage 175 of the wireless terminal 100 may be transmitted to the external device via a cable connected to the connector 165, or data may be received from the external device. Power may be received from the power source via a cable connected to the connector 165 or a battery (not shown) may be charged.

The keypad 166 may receive key inputs from the user to control the wireless terminal 100. The keypad 166 includes a physical keypad (not shown) formed in the wireless terminal 100, or a virtual keypad (not shown) displayed on the touchscreen 190. The mechanical keypad formed in the wireless terminal 100 may be excluded depending on the performance or structure of the wireless terminal 100.

The sensor module 170 includes at least one sensor for detecting a status of the wireless terminal 100. For example, the sensor module 170 may include a proximity sensor for detecting proximity of the user to the wireless terminal 100, an illumination sensor (not shown) for detecting an amount of ambient light, or a motion sensor (not shown) for detecting an operation of the wireless terminal 100 (e.g., rotation of the wireless terminal 100, acceleration or vibration imposed on the wireless terminal 100). At least one sensor may detect the status and generate a corresponding signal to transmit to the controller 110. The sensor of the sensor module 170 may be added or removed depending on the performance of the wireless terminal 100.

The storage 175 may store signals or data input/output according to operations of the mobile communication module 120, the sub-communication module 130, the multimedia module 140, the camera module 150, the GPS module 155, the input/output module 160, the sensor module 170, the touchscreen 190 under control of the controller 110. The storage 175 may store the control programs and applications for controlling the wireless terminal 100 or the controller 110.

The term "storage" implies not only the storage 175, but also the ROM 112, RAM 113 in the controller 110, or a memory card (not shown) (e.g., a Secure Digital (SD) card, a memory stick) installed in the wireless terminal 100. The storage 175 may also include a non-volatile memory, volatile memory, Hard Disc Drive (HDD), or Solid State Drive (SSD).

The power supply 180 may supply power to one or more batteries (not shown) arranged inside the housing of the wireless terminal 100 under control of the controller 110. The one or more batteries power the wireless terminal 100. The power supply 180 may supply the wireless terminal 100 with the power input from the external power source (not shown) via a cable connected to the connector 165.

The touchscreen 190 may provide the user with a user interface for various services (e.g., call, data transmission, broadcasting, photography services). The touchscreen 190 may send an analog signal corresponding to at least one touch input to the user interface to the touchscreen controller 195. The touchscreen 190 may receive the at least one touch from user's physical contact (e.g., with fingers including thumb) or via a touchable input device (e.g., a stylus pen). The touchscreen 190 may receive consecutive moves of one of the at least one touch. The touchscreen 190 may send an analog signal corresponding to the consecutive moves of the input touch to the touchscreen controller 195.

Touches in the present disclosure are not limited to physical touches by a physical contact of the user or contacts with the touchable input means, but may also include touchless (e.g., keeping a detectable distance less than 1 mm between the touch screen 190 and the user's body or touchable input means). The detectable distance from the touchscreen 190 may vary depending on the performance or structure of the wireless terminal 100.

The touchscreen 190 may be implemented in e.g., a resistive way, capacitive way, infrared way, or acoustic wave way.

The touchscreen controller 195 converts the analog signal received from the touchscreen 190 to a digital signal (e.g., XY coordinates) and transmits the digital signal to the controller 110. The controller 110 may control the touchscreen 190 by using the digital signal received from the touchscreen controller 195. For example, in response to the touch, the controller 110 may enable a shortcut icon (not shown) displayed on the touchscreen 190 to be selected or to be executed. The touchscreen controller 195 may also be incorporated in the controller 110.

Figure 2:
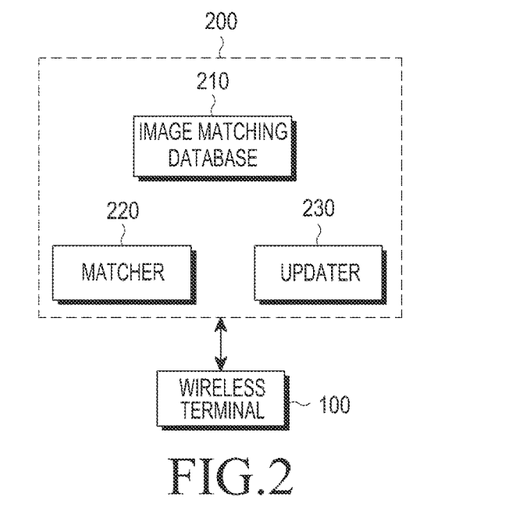
FIG. 2 is a block diagram of an apparatus for tracking a location of a wireless terminal based on an image, according to an exemplary embodiment of the present invention.

FIG. 2 is a block diagram of an apparatus for tracking a location of a wireless terminal based on an image, according to an exemplary embodiment of the present invention.

Referring to FIG. 2, the apparatus 200 may include an image matching database 210, a matcher 220, and an updater 230.

Figure 3:
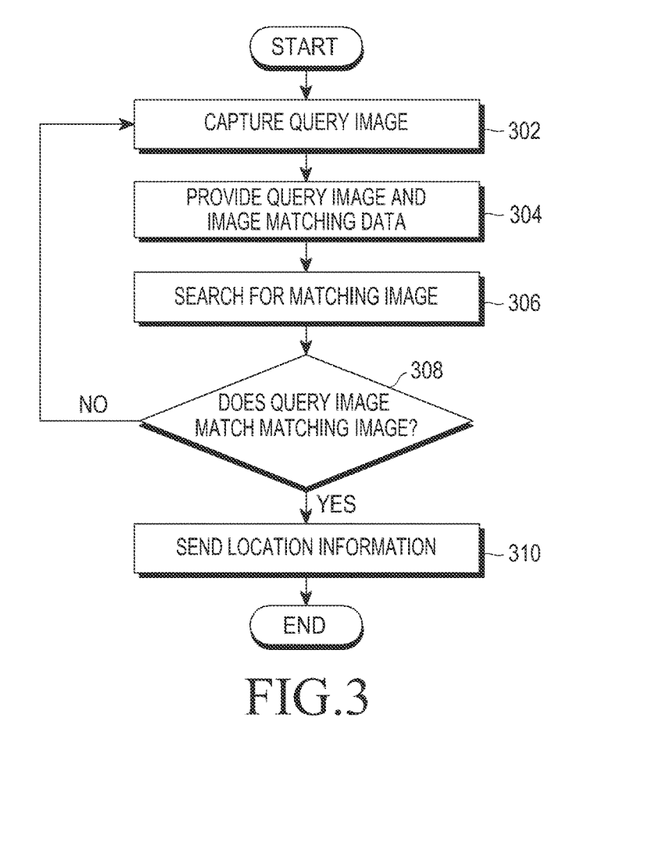
FIG. 3 is a flowchart of a method of tracking a location of a wireless terminal based on an image, according to an exemplary embodiment of the present invention.

FIG. 3 is a flowchart of a method of tracking a location of a wireless terminal based on an image, according to an exemplary embodiment of the present invention.

Referring to FIG. 3, the method includes capturing a query image, in step 302; providing the query image and image matching data, in step 304; searching for a matching image, in step 306; determining if there is a match between the query image and the matching image, in step 308; and providing location information, in step 310.

The method and apparatus for tracking a location of the wireless terminal 100 based on an image according to an exemplary embodiment of the present invention will now be described with reference to FIGS. 2 and 3.

The method begins with the camera module 150 of the wireless terminal 100 capturing a query image in step 302. In order to track the location of the wireless terminal 100 based on an image, an image captured around a present location of the wireless terminal 100 is required. Herein, the image is referred to as a query image. The wireless terminal 100 may obtain the query image with which to track the location from a user's photography. For example, an image containing a street-view with a landmark building or object (e.g., tower, facility, tree, sculpture, etc.) may be captured by the user as the query image.

In step 304, communication modules 120 and 130 send the matcher 220 the query image and the image matching data containing region information about where the query image is captured. The query image and the image matching data are sent to the matcher 220 to be used in step 306 to search for a matching image, which will be described below. The region information may include at least one of GPS data and orientation data. The GPS data and the orientation data may be obtained by the GPS module 150 and a compass device (not shown) of the wireless terminal 100, respectively. The GPS module 155 receives radio signals from a plurality of GPS satellites in Earth's orbit, and may calculate GPS data, the location of the wireless terminal 100 by using time of arrival from the GPS satellites to the wireless terminal 100. The GPS data obtained by the GPS module 155 may be expressed in e.g., latitude, longitude, and/or altitude.

In step 306, the matcher 220 searches the image matching database 210 for a matching image that corresponds to the image matching data. The image matching database 210 stores images that are classified by regions beforehand. In other words, images classified by GPS data and orientation data are stored beforehand in the image matching database 210. Thus, matcher 220 searches the image matching database 210 for a matching image that corresponds to the region information received in step 304, i.e., the GPS data and orientation data taken at a time when the query image is captured.

Figure 4A:
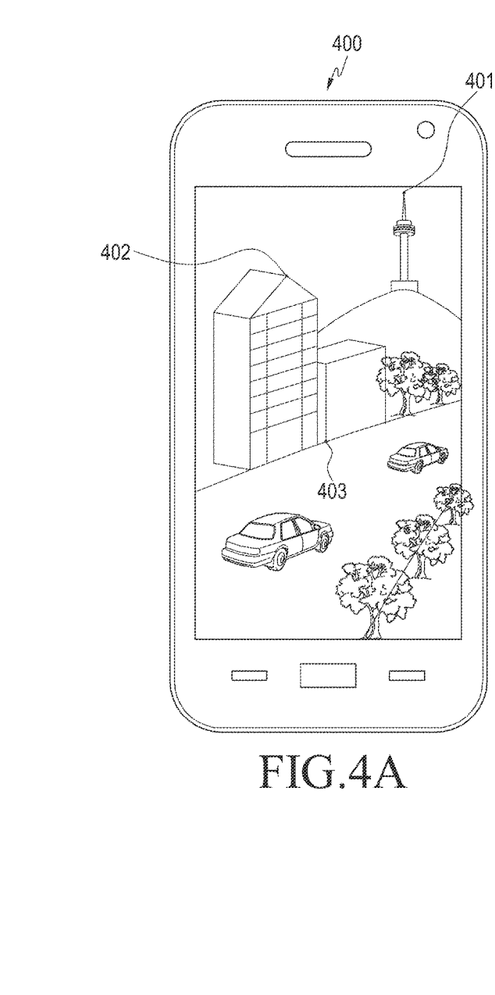
FIGS. 4A and 4B illustrate a query image and a matching image to be matched by a matcher according to an exemplary embodiment of the present invention.
Figure 4B:
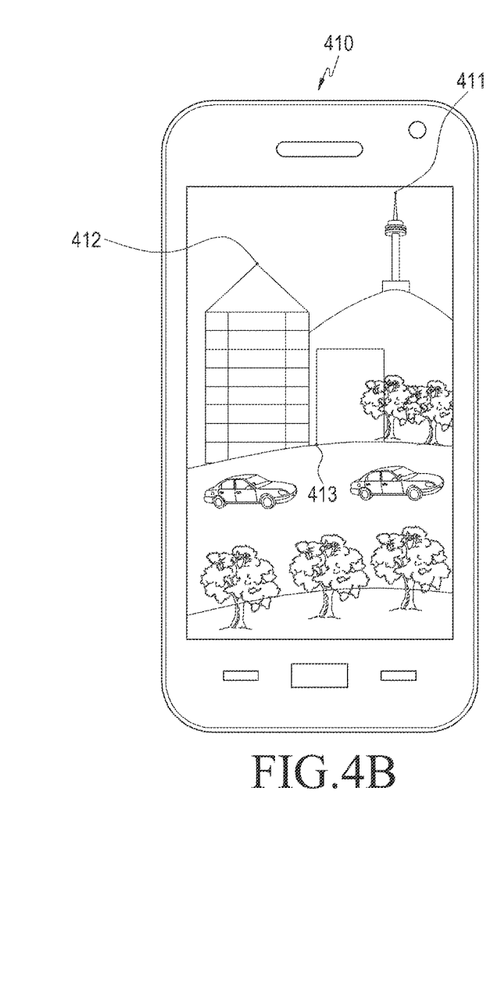

In step 308, the matcher 220 determines if the query image matches the searched matching image. FIGS. 4A and 4B illustrate the query image and the matching image to be matched by the matcher 220 according to an exemplary embodiment of the present invention. Referring to FIGS. 4A and 4B, a query image 400 and a matching image 410 are shown, respectively. Firstly, the matcher 220 extracts at least one corresponding singularity pair from the query image 400 and the matching image 410. For example, in FIGS. 4A and 4B, tower tops 401 and 411, building tops 402 and 412, starting points of a building 403, 413, and/or the like are extracted as singularity pairs. The matcher 220 determines that the query image 400 matches the matching image 410 if a similarity in the singularity pair between the query image 400 and the matching image 410 is greater than a predetermined threshold, the similarity being calculated by measuring a difference in length or angle between the at least one singularity pair 401 and 411, 402 and 412, and/or 403 and 413. For example, as shown in FIGS. 4A and 4B, if the similarity in the singularity pair 401 and 411, which is calculated by measuring difference in length or angle between them, is greater than a predetermined threshold, the query image 400 is determined to be matched with the matching image 410. Otherwise, if the query image 400 and the matching image 410 do not match, the process goes back to step 302 to capture a query image again.

Next, in step 310, the matcher 220 sends the wireless terminal 100 the location information corresponding to the matching image. In step 308, if the query image 400 makes a match with the matching image 410, it means that a location of the wireless terminal at a time when the query image 400 is captured is the same as a location that corresponds to the matching image 410 stored in the image matching database 210. Thus, from the location information corresponding to the matching image, the location where the query image was captured may be figured out. The matcher 220 provides the location information that corresponds to the matching image for the wireless terminal 100 to track the location of the wireless terminal 100. The location information corresponding to the matching image may be GPS data such as, latitude, longitude, and/or altitude, or orientation data. Alternatively, the location information corresponding to the matching image may be position information that contains the latitude, longitude, and altitude for building a 3D map, or 3D orientation information.

Figure 5A:
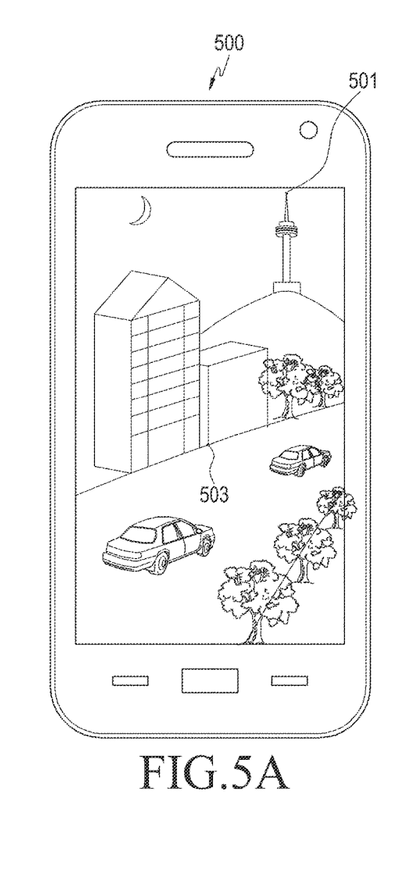
FIGS. 5A and 5B illustrate a query image and a matching image to be matched according to an exemplary embodiment of the present invention.
Figure 5B:
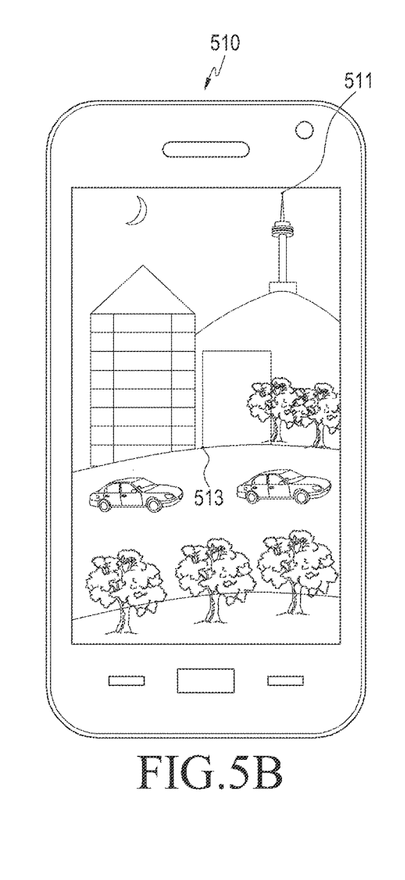

FIGS. 5A and 5B illustrate a query image and a matching image to be matched according to an exemplary embodiment of the present invention.

In the apparatus and method of tracking a location of the wireless terminal 100 based on an image, the image matching data may further include time information regarding when the query image is captured. The image matching database 210 may classify and store images classified by regions by periods.

A user of the wireless terminal 100 typically wants to track the location of the wireless terminal 100 at any time of the day or night. However, in a case where buildings or structures look different between the query images captured during the day and night, a matching success rate becomes low and thus, the tracking accuracy becomes low. That is why matching images should be stored in the image matching database 210 by periods. The periods may be hours or seasons. Thus, in another exemplary embodiment of the present invention, in addition to a query image 500 captured in step 302 and region information regarding where the query image 500 is captured, the time information regarding when the query image 500 is captured is sent to the matcher 220, in step 304. Images classified by regions are further classified by periods and then stored in the image matching database 210. The matcher 220 then searches the image matching database 210 for a matching image 510 that corresponds to the region information and the time information. The matcher 220 determines if the matching image 510 matches the query image 500. Then, the matcher 220 sends location information that corresponds to the matching image to the wireless terminal 100, if the matching image matches the query image 500.

For example, in FIGS. 5A and 5B, the user tries to track the location of the wireless terminal 100 in the evening. Unlike the query image 400 of FIG. 4, which is captured in the day time, the query image 500 captured in the evening may only show a tower top 501 from which the lights are emitted or starting point 503 of a building within a short range without the building top 402. Thus, the building tower 402 of the query image 400 may not be extracted as a singularity from the query image 500, and should not be used in matching. For this reason, the image matching database 210 stores a matching image 510 classified into evening time to be matched to the query image 500 captured in evening time, thus increasing the matching success rate and the accuracy of the location tracking. That is, in FIGS. 5A and 5B, points of interest, such as tower tops 501 and 511 and starting points 503 and 513 of a building may be extracted as singularity pairs. If a similarity in each of the singularity pairs 501 and 511 and 503 and 513, which is calculated by measuring a difference in length or angle between them, is greater than a predetermined threshold, the query image 500 and the matching image 510 may be determined to be matched.

Figure 6A:
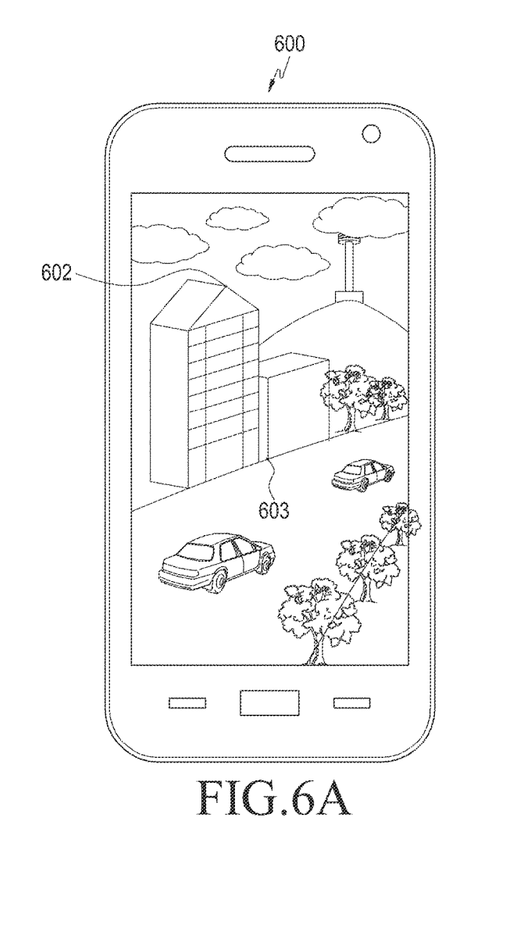
FIGS. 6A and 6B illustrate a query image and a matching image to be matched according to an exemplary embodiment of the present invention.
Figure 6B:
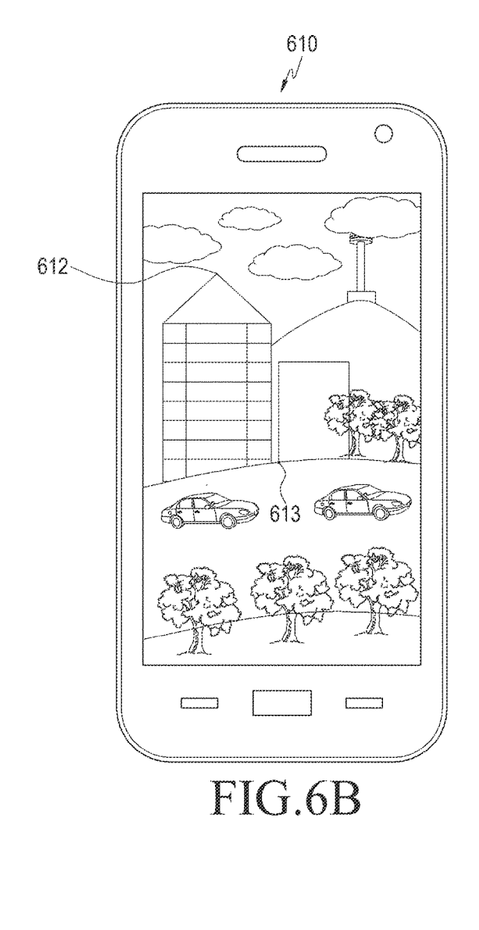

FIGS. 6A and 6B illustrate a query image and a matching image to be matched according to an exemplary embodiment of the present invention.

In the apparatus and method of tracking a location of the wireless terminal 100 based on an image, the image matching data may further include weather information about a weather condition under which the query image is captured. The image matching database 210 may classify and store images classified by regions by weather conditions.

The user of the wireless terminal 100 may want to track the location of the wireless terminal 100. However, in a case where buildings or structures look different between the query images captured on sunny days and cloudy days, the matching success rate becomes low and thus, the tracking accuracy becomes low. That is why matching images should be stored in the image matching database 210 by weather conditions. Thus, in another exemplary embodiment of the present invention, in addition to a query image 600 captured in step 302 and region information regarding where the query image 600 is captured, the weather information is sent to the matcher 220, in step 304. Images classified by regions are further classified by weather conditions and stored in the image matching database 210. The matcher 220 then searches the image matching database 210 for a matching image 610 that corresponds to the region information and the weather information of the query image 600. The matcher 220 determines if the searched matching image 610 matches the query image 600. Then, the matcher 220 sends location information that corresponds to the matching image to the wireless terminal 100, if the matching image matches the query image 500.

For example, in FIGS. 6A and 6B, the user tries to track the location of the wireless terminal 100 on a cloudy day. Unlike the query image 400 of FIG. 4, which is captured on a sunny day, the query image 600 captured on a cloudy day may only show the building tower 602 and the starting point 603 of the building within a short range without the tower top 501. Thus, the tower top 501 of the query image 400 may not be extracted as a singularity from the query image 600, and should not be used in matching. For this reason, the image matching database 210 stores a matching image 610 classified into a cloudy day to be matched to the query image 600 captured on the cloudy day, thus increasing the matching success rate and then the accuracy of the location tracking. That is, in FIGS. 6A and 6B, points, such as building tops 602 and 612 and starting points 603 and 613 of the building may be extracted as singularity pairs. If a similarity in each of the singularity pairs 602 and 612 and 603 and 613, which is calculated by measuring difference in length or angle between them, is greater than a predetermined threshold, the query image 600 and the matching image 610 may be determined to be matched.

Figure 7:
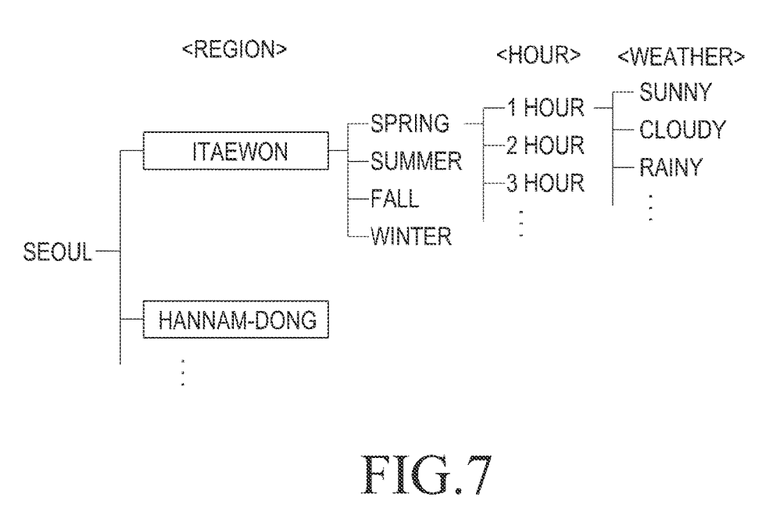
FIG. 7 illustrates a data structure of an image matching database in which to store images by regions, periods, and weather conditions according to an exemplary embodiment of the present invention.

FIG. 7 illustrates a data structure of an image matching database in which to store images by regions, periods, and weather conditions according to an exemplary embodiment of the present invention.

The image matching database 210 may store images classified by regions, which may be further classified by hours, which may be further classified by weather conditions. In other words, when requested by the matcher 220 for a matching image that corresponds to the image matching data containing the region information, time information, and weather information, the image matching database 210 may provide the pre-stored matching image that corresponds to the image matching data. The time information may be classified into four seasons or 24 hours. The image matching database 210 may store matching images by regions, hours, weather conditions falling under a hierarchy as shown in FIG. 7. The hierarchical order of regions, hours, and weather conditions as shown in FIG. 7 may be changed in another exemplary embodiment of the present invention e.g., to an order of regions, weather conditions, and hours. More specifically, in FIG. 7, the image matching database 210 may store matching images in a hierarchical order starting from images captured in Itaewon, Seoul, which are then classified by seasons, hours, and weather conditions (e.g., sunny day, cloudy day, and rainy day) in sequence.

Figure 8:
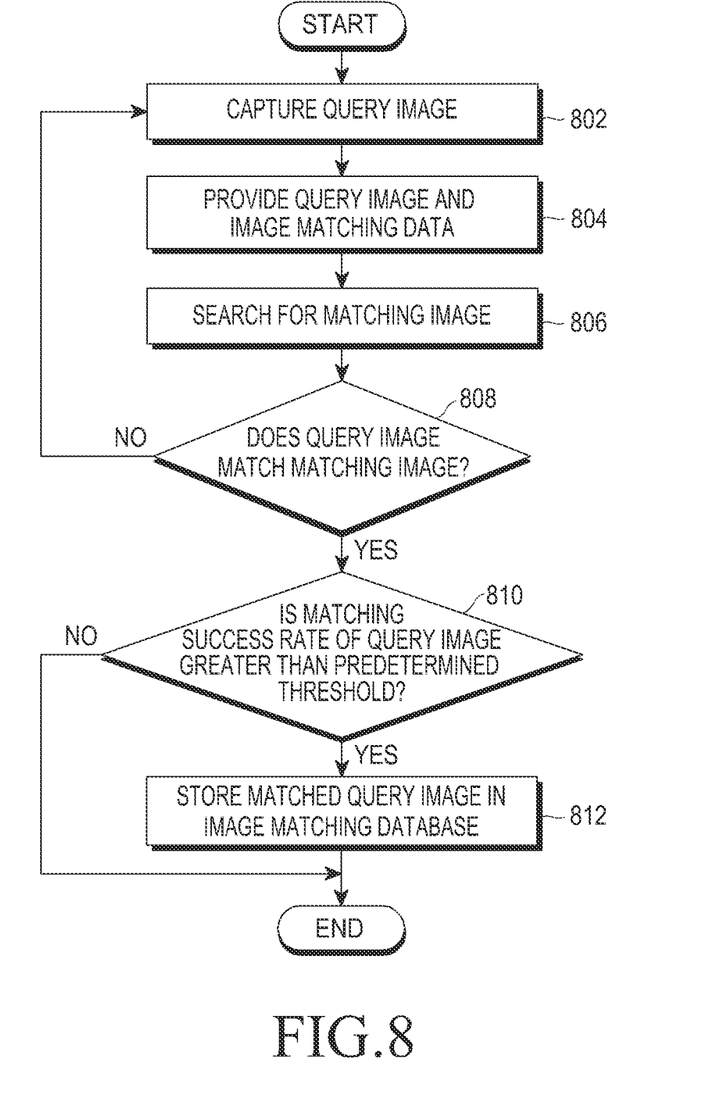
FIG. 8 is a flowchart of a method of tracking a location of a wireless terminal based on an image, according to another exemplary embodiment of the present invention.

FIG. 8 is a flowchart of a method of tracking a location of a wireless terminal based on an image, according to another exemplary embodiment of the present invention.

Referring to FIG. 8, the method includes capturing a query image, in step 802; providing the query image and image matching data, in step 804; searching for a matching image, in step 806; determining whether the query image matches the matching image, in step 808; determining if a matching success rate of the query image that makes a match with the matching image is greater than a predetermined threshold, in step 810; and updating the image matching database 210 by storing the query image in the image matching database 210 if the matching success rate is greater than the predetermined threshold, in step 812.

Steps 802 to 808 are identical to steps 302 to 308 of FIG. 3, thus the description of which will be omitted. If the query image matches the matching image, in step 808, the matcher 220 determines the matching success rate of the query image and the matching image, in step 810. The matching success rate refers to how much greater the similarity as described above in connection with FIGS. 3 and 4 between the query image and the matching image calculated by measuring a difference in length or angle between the singularity pair is compared with the predetermined threshold. In step 812, the matcher 220 updates the image matching database 210 by storing the query image that makes a match, if the matching success rate is greater than the predetermined threshold. Updating the image matching database with the query image having a higher matching success rate may increase possibility of future matching success. Compared with newly obtaining and storing all matching images of road views all over the country and world in the image matching database 210, which requires huge investment of time and money, updating the matching images without need for separately obtaining them is deemed much more time-and cost-effective. In the multiple matching processes, a plurality of query images may be stored in the image matching database 210 by regions. Since the multiple matching processes are performed at different hours, the plurality of query images for a region may be stored by hours. After updating the plurality of query images, the user may receive a plurality of images by hours with respect to a region where his/her wireless terminal is located, and thus offering e.g., a Time Machine service.

In another exemplary embodiment of the present invention, the method may further include updating the image matching database by replacing the matching image by the query image if the matching success rate of the query image and the matching image is greater than the predetermined threshold. In other words, if the matching success rate is greater than the predetermined threshold, the matching image stored in the image matching database 210 is automatically updated by being overwritten by the query image.

In another exemplary embodiment of the present invention, the method may further include updating the image matching database 210 by storing a query image selected by the user from among a plurality of query images if matching success rates of the plurality of query images that make matches are greater than the predetermined threshold. In other words, in order to update the image matching database 210, the user who manages the image matching database 210 may select one from among the plurality of query images obtained in multiple matching processes whose matching success rates are greater than the predetermined threshold, and store the query image in the image matching database 210.

The method and apparatus is characterized by using tracked location information to offer a location-based street-view service, or to offer a location-based Augmented Reality (AR) service. With the method and apparatus of another exemplary embodiment of the present invention, location information with an accuracy high enough to be used in a 3D map may be provided to the wireless terminal 100, and thus, the location information may be used to offer the location-based street-view service or the location-based AR service. The location-based street-view service refers to a service to display a view of a street where the wireless terminal 100 is located. Thus, in another exemplary embodiment of the present invention, location information with high accuracy may be provided and then used in the location-based street-view service. The location-based AR service refers to a service to provide a combined preview captured by the camera module 150 of the wireless terminal 100 and augmented information (e.g., GPS, billboards, etc.). Thus, in another exemplary embodiment of the present invention, location information with high accuracy may be provided and then used in the AR service.

The techniques described herein have an advantage of increasing measurement accuracy with the apparatus and method of tracking a location of a wireless terminal based on an image.

The techniques described herein have another advantage of providing an image matching database to increase the measurement accuracy with the apparatus and method of tracking a location of a wireless terminal based on an image.

The techniques described herein have yet another advantage of providing an updating technique to increase the measurement accuracy with an apparatus and method of tracking a location of a wireless terminal based on an image.

The techniques described herein have yet another advantage of providing an augmented reality service by increasing the measurement accuracy with the apparatus and method of tracking a location of a wireless terminal based on an image.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for tracking a location of a wireless terminal based on an image, the apparatus comprising:
   an image matching database configured to store images classified by regions;
   a matcher configured to:
      receive a query image captured by a camera module of the wireless terminal and image matching data that contains region information identifying a location at which the query image is captured, wherein the region information includes Global Positioning System (GPS) data and orientation data from a compass device of the wireless terminal,
      search the image matching database for a matching image that corresponds to the image matching data,
      extract at least two singularities from the query image and the matching image, wherein the at least two singularities correspond to each other,
      determine if the query image matches the matching image by measuring a difference in length and angle between the at least two singularities from the query image and the matching image, and
      send location information identifying the location of the wireless terminal that corresponds to the matching information when the query image matches the matching image, wherein the location information includes position information and orientation information, such that the location of the wireless terminal is identified based on the received query image, the received GPS data and the received orientation data; and an updater configured to update the image matching database using the query image if a matching success rate of the query image is greater than a predetermined threshold, wherein the matching success rate of the query image is determined by measuring the difference in length and angle between the at least two singularities from the query image and the matching image, wherein the image matching database provides a plurality of images classified by hours to the wireless terminal, when the updater updates the image matching database using the query image, and wherein the plurality of images is with respect to the location of the wireless terminal.

2. The apparatus of claim 1, wherein the image matching database stores images by classifying images, which are classified by regions, by periods.

3. The apparatus of claim 1, wherein the image matching database stores images by classifying images, which are classified by regions, by weather conditions.

4. The apparatus of claim 1, wherein the image matching data further includes time information identifying a time at which the query image is captured.

5. The apparatus of claim 1, wherein the image matching data further includes weather information identifying a weather condition during which the query image is captured.

6. The apparatus of claim 1, wherein the position information includes latitude, longitude, and altitude coordinates for building a three dimensional map.

7. The apparatus of claim 1, wherein the updater is further configured to store, in the image matching database, the query image that matches the matching image, if the matching success rate of the query image is greater than the predetermined threshold.

8. The apparatus of claim 1, wherein the updater is further configured to store, in the image matching database, the query image that matches the matching image by replacing the matching image with the query image, if the matching success rate of the query image is greater than the predetermined threshold.

9. The apparatus of claim 1, wherein the updater is further configured to store, in the image matching database, the query image selected by a user from among a plurality of query images, if a matching success rate of each of the plurality of query images obtained from a plurality of matching processes is greater than a predetermined threshold.

10. The apparatus of claim 1, wherein the location information is used to offer a location-based street-view service or a location-based Augmented Reality (AR) service.

11. A method of tracking a location of a wireless terminal based on an image, the method comprising:

capturing, by a camera module of the wireless terminal, a query image;

providing, by a communication module of the wireless terminal, the query image and image matching data that contains region information identifying a location at which the query image is captured to a matcher, wherein the region information includes Global Positioning System (GPS) data and orientation data from a compass device of the wireless terminal;

searching an image matching database for a matching image that corresponds to the image matching data;

extracting at least two singularities from the query image and the matching image, wherein the at least two singularities correspond to each other;

determining if the query image matches the matching image by measuring a difference in length and angle between the at least two singularities from the query image and the matching image;

sending location information identifying the location of the wireless terminal that corresponds to the matching information when the query image matches the matching image, wherein the location information includes position information and orientation information, such that the location of the wireless terminal is identified based on the received query image, the received GPS data and the received orientation data;

updating the image matching database using the query image if a matching success rate of the query image is greater than a predetermined threshold; and receiving from the image matching database a plurality of images classified by hour, when updating the image matching database using the query image, wherein the plurality of images are with respect to the location of the wireless terminal, and wherein the matching success rate of the query image is determined by measuring the difference in length and angle between the at least two singularities from the query image and the matching image.

12. The method of claim 11, wherein the image matching database stores images by classifying images, which are classified by regions, by periods.

13. The method of claim 11, wherein the image matching database stores images by classifying images, which are classified by regions, by weather conditions.

14. The method of claim 11, wherein the image matching data further includes time information indicating a time at which the query image is captured.

15. The method of claim 11, wherein the image matching data further includes weather information indicating a weather condition during which the query image is captured.

16. The method of claim 11, wherein the position information includes latitude, longitude, and altitude coordinates for building a three dimensional map.

17. The method of claim 11, wherein the updating the image matching database using the query image comprises updating the image matching database by storing, in the image matching database, the query image that matches the matching image.

18. The method of claim 11, wherein the updating the image matching database using the query image comprises updating the image matching database by storing, in the image matching database, the query image that matches the matching image by replacing the matching image with the query image.

19. The method of claim 11, wherein the updating the image matching database using the query image comprises updating the image matching database by storing, in the image matching database, a query image selected by a user from among a plurality of query images.

20. The method of claim 11, wherein the location information is used to offer a location-based street-view service or a location-based Augmented Reality (AR) service.

21. A wireless terminal, the wireless terminal comprising:
a camera module;
a communication module;
a Global Positioning System (GPS) module;
a compass device;
a controller configured to:
capture a query image by the camera module,
send the query image and image matching data to an apparatus for tracking a location, wherein the image matching data contains region information identifying a location at which the query image is captured, and wherein the region information includes GPS data obtained by the GPS module and orientation data obtained by the compass device, and receive, from the apparatus, location information identifying the location of the wireless terminal that corresponds to a matching image that matches the query image, wherein the location information received from the apparatus includes position information and orientation information, such that the location of the wireless terminal is identified based on the query image, the GPS data and the received orientation data; and an updater configured to update the image matching database using the query image if a matching success rate of the query image is greater than a predetermined threshold, wherein the matching success rate of the query image is determined by extracting at least two singularities from the query image and the matching image and then measuring the difference in length and angle between the at least two singularities from the query image and the matching image, wherein the at least two singularities correspond to each other, wherein the controller is further configured to receive from the image matching database a plurality of images classified by hour, when the updater updates the image matching database using the query image, and wherein the plurality of images are with respect to the location of the wireless terminal.

* * * * *